United States Patent [19]

Nugent

[11] Patent Number: 5,317,564
[45] Date of Patent: May 31, 1994

[54] MERGING NETWORK FOR COLLECTION OF DATA FROM MULTI-COMPUTERS

[75] Inventor: Steven F. Nugent, Portland, Oreg.

[73] Assignee: Intel Corporation, Santa Clara, Calif.

[21] Appl. No.: 998,528

[22] Filed: Dec. 30, 1992

[51] Int. Cl.[5] .......................... H04J 3/14; H04J 3/24; H04L 12/56

[52] U.S. Cl. .......................... 370/17; 370/56; 370/60; 370/85.9; 370/94.1; 370/94.3; 340/825.02

[58] Field of Search ............... 370/54, 56, 58.1–58.3, 370/60, 85.1, 85.2, 85.4, 85.9, 85.11, 85.13, 94.1, 94.3, 110.1, 112, 17; 340/825.02, 825.06, 825.5, 825.51; 379/333, 334; 395/200, 325

[56] References Cited

U.S. PATENT DOCUMENTS

| | | | |
|---|---|---|---|
| 4,535,448 | 8/1985 | Baxter et al. | 370/85.11 |
| 4,604,743 | 8/1986 | Alexandru | 370/94.1 |
| 4,933,936 | 6/1990 | Rasmussen et al. | 370/94.3 |
| 4,982,185 | 1/1991 | Holmberg et al. | 370/94.1 |
| 5,105,424 | 4/1992 | Flaig et al. | 370/94.3 |

*Primary Examiner*—Douglas W. Olms
*Assistant Examiner*—Alpus H. Hsu
*Attorney, Agent, or Firm*—Blakely, Sokoloff, Taylor & Zafman

[57] ABSTRACT

The present invention finds application in the field of multi-computers, and more particularly to the collection of data from nodes in a multi-computer system. The multi-computer includes a number of nodes for performing computing and data transfer functions, each node communicating with one or more other nodes in the multi-computer through a message routing network. Each node includes a measurement device for measuring predetermined events occurring within each node. The system includes a concentrator bus for communicating measurement data packets produced by the measurement device, and a concentrator node for outputting a multiplexed serial sequence of the measurement data packets in response to a parallel asynchronous input of the measurement data packets received over the concentrator bus from the nodes. The multiplexed serial sequence of measurement data packets is communicated over a collection bus to a collection node that demultiplexes and processes the measurement data packets.

7 Claims, 6 Drawing Sheets

MERGING NETWORK FOR COLLECTION OF DATA FROM MULTI-COMPUTERS

BACKGROUND OF THE INVENTION

1. Field of the Invention

The present invention relates to the field of information processing, and in particular to a secondary data transfer network in a multi-processor environment.

2. Description of the Related Art

Many modern computer systems employ multiple processing units designed to perform a variety of tasks. In the typical mainframe or minicomputer, individual processing boards or "nodes" are mounted in a card cage and connected to a backplane so that data may be routed to and from the processing boards over a message routing network connected to the backplane. The node boards plugged into the backplane may also serve primarily as memory elements, which can be shared by the processor nodes.

For a variety of functions, computer system users and designers often desire to collect certain data from the individual nodes. For example, the system might be used to monitor the performance of the nodes. By keeping track of parameters such as the number of times each node accesses memory or a particular subroutine, the percentage of bus bandwidth being utilized, and the communication traffic between different node boards, a system designer can efficiently configure the computer system and application programs to optimize performance.

FIG. 1 illustrates a conventional method of collecting data from nodes in a multi-processor system. (The terms "multi-processor" and "multi-computer" are used interchangeably herein.) Nodes 101, 102, 103 and 104 communicate with each other over a routing network 105, which in this case is shown in the conventional "butterfly" form. One of the nodes may serve as a collection node 103 to receive the performance measurements (or other data to be collected) from the nodes over the same "butterfly" network that is used for interprocessor communications. The heavy lines in FIG. 1 illustrate the path in the routing network taken by information communicated between nodes 101 and 104. The line marked with squares defines the path traversed by information collected from node 101 by collection node 103. This routing diagram demonstrates that because collection data is sent over the same network as data used by the multi-processor system during routine operations, such as the running of application and operating system programs, both the routine operations and the data collection process contend for the same portion of the routing path. Such a dual-use configuration is dubbed an "invasive" data collection or monitoring technique.

Invasive methods pose special problems when the collection system is designed to measure system performance. Not only does an invasive monitoring system slow down the measurement process, but it also affects the measurements themselves. Because the performance data travels over the same paths as all other information communicated between the processors, it is nearly impossible to factor out the effects on system performance caused by the performance measurement process itself. This is due primarily to the randomness of contention events that occur when routing resources are to be shared.

One prior art solution to the problems posed by invasive performance monitoring techniques is to collect relevant data using an independent, noninvasive collection network. For example, FIG. 2 illustrates the use of a token ring 201 that is independent of message routing network 202 to collect performance data from nodes 203, 204 and 205. In this example, node 204 has possession of the token 206. Thus, node 204 has control of the token ring and can send information along the ring to a collection processor 207. A major deficiency of this serial collection method is that only one node can send messages along the token ring at a time. Consequently, processor 207 cannot collect real-time performance data and will actually miss the collection of certain real-time parameters unless the nodes store the relevant information until they obtain possession of the token and control the token ring.

The present invention overcomes the drawbacks of conventional implementations by providing a noninvasive secondary data transfer network that enables the asynchronous parallel collection of data from nodes in a multi-computer.

SUMMARY OF THE INVENTION

The present invention finds application in the field of multi-computers, and more particularly to the collection of data from nodes in a multi-computer system. The multi-computer includes a plurality of nodes for performing computing and data transfer functions, each node communicating with one or more other nodes in the multi-computer through a message routing network. Each node includes a measurement device for measuring predetermined events occurring within each node. The system includes a concentrator bus for communicating measurement data packets produced by the measurement device, and a concentrator node for outputting a multiplexed serial sequence of the measurement data packets in response to a parallel asynchronous input of the measurement data packets received over the concentrator bus from the nodes. The multiplexed serial sequence of measurement data packets is communicated over a collection bus to a collection node that demultiplexes and processes the measurement data packets.

BRIEF DESCRIPTION OF THE DRAWINGS

The objects, features and advantages of the present invention will be apparent to one skilled in the art in light of the following detailed description in which.

DETAILED DESCRIPTION OF THE INVENTION

The present invention provides a method and apparatus for the parallel asynchronous collection of data from a multi-computer system in a noninvasive manner. For purposes of explanation, specific embodiments are set forth to provide a thorough understanding of the present invention. However, it will be apparent to one skilled in the art that the invention may be practiced without these details. In other instances, well known elements, devices, steps and the like are not set forth in detail in order to avoid unnecessarily obscuring the present invention.

The present invention provides a noninvasive secondary data transfer network that avoids creating signal traffic on the message routing backplane of a multi-computer, thereby preventing interference with the running of application and operating system programs and, in the case of performance monitoring, with the monitoring process. In addition, the invention collects data in parallel from the nodes, thus permitting data collection at rates faster than that achieved by the prior art and enabling real-time data collection and performance monitoring.

Figure 1:
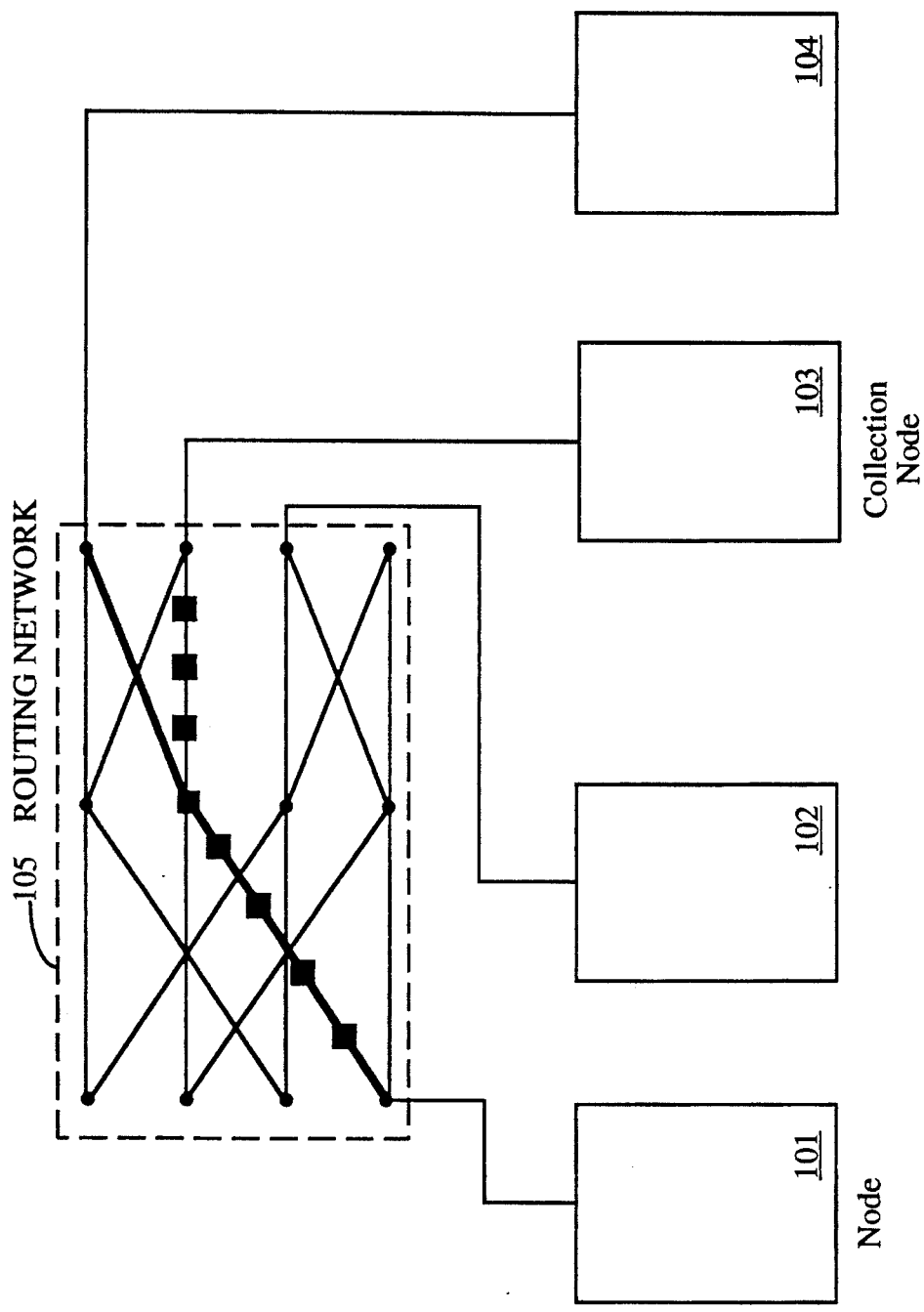
FIG. 1 illustrates a conventional invasive data collection system for multi-processors.
Figure 2:
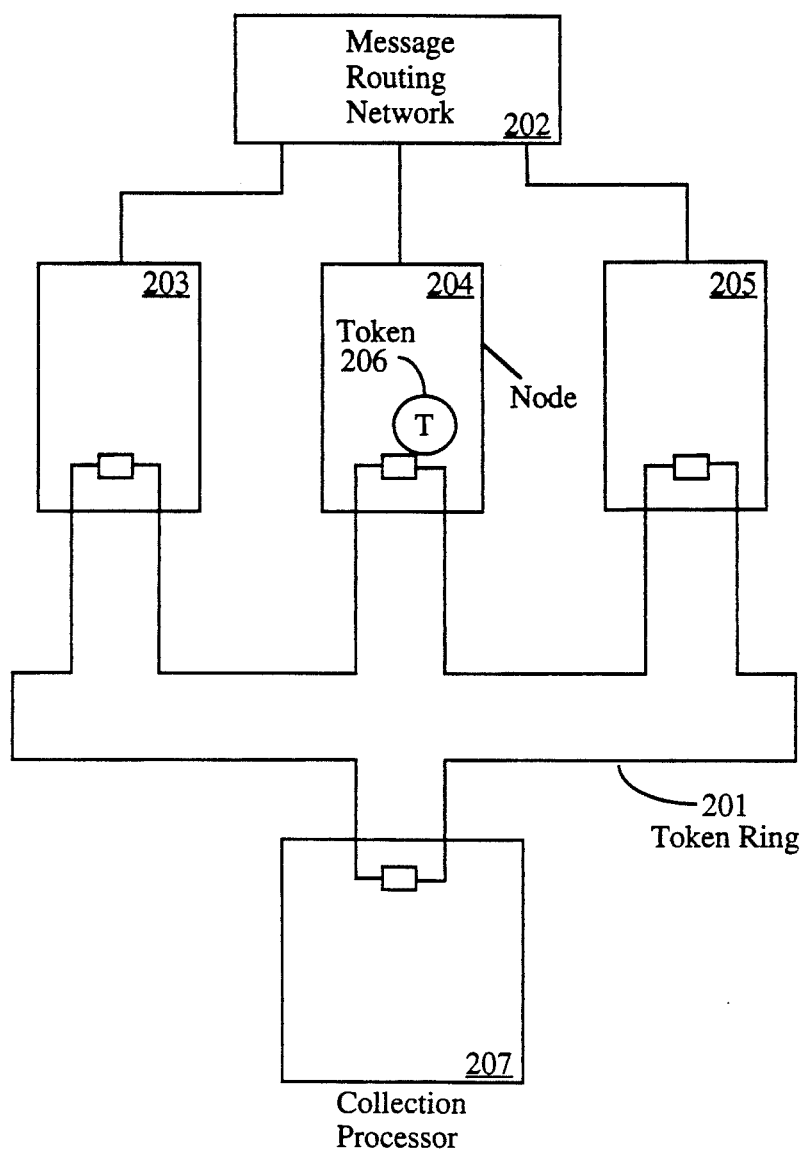
FIG. 2 illustrates a conventional noninvasive serial data collection system utilizing a token ring.
Figure 3:
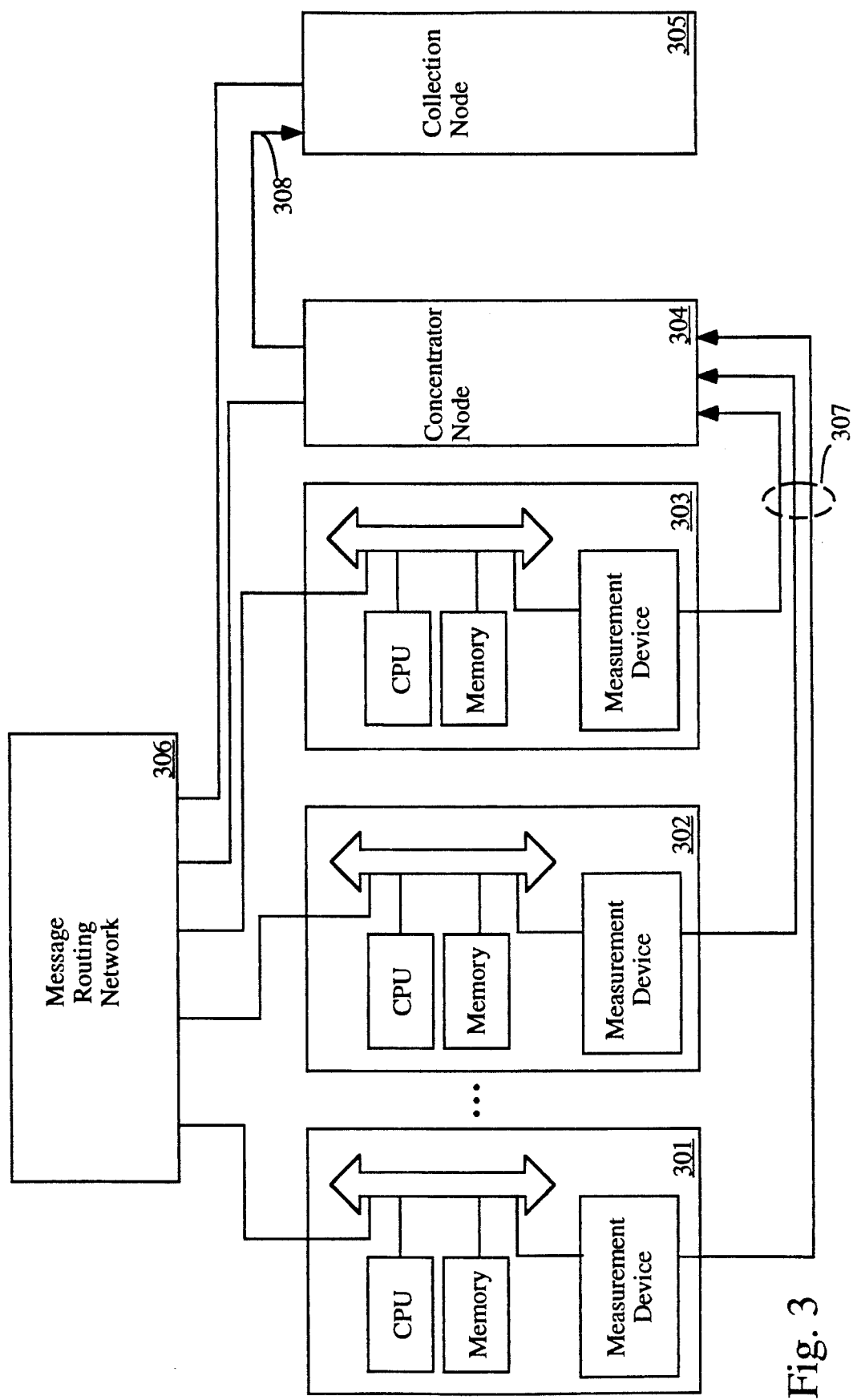
FIG. 3 is a block diagram of the system of the present invention.

FIG. 3 illustrates one configuration of the present invention in a multi-processor environment. The multi-processor comprises a number of nodes 301, 302, 303, 304 and 305. Each node acts as a computer or serves as a memory unit shared by other nodes in the group. The nodes are implemented on node boards plugged into the backplane of one or more card cages. The nodes communicate with each other over the backplane through a message routing network 306. The invention includes two dedicated nodes, a concentrator node 304 and a collection node 305. The concentrator node 304 receives the data to be collected asynchronously and in parallel from the other nodes in the multi-computer over dedicated lines on the backplane, herein referred to collectively as the concentrator bus 307. The concentrator node 304 converts the parallel data packets received over bus 307 into a serial stream of packets sent to the collection node 305 over a dedicated collection bus 308, which may be simply implemented as a cable. Note that the collection node 305 can receive data from concentrator nodes in any card cage in the system.

Figure 4:
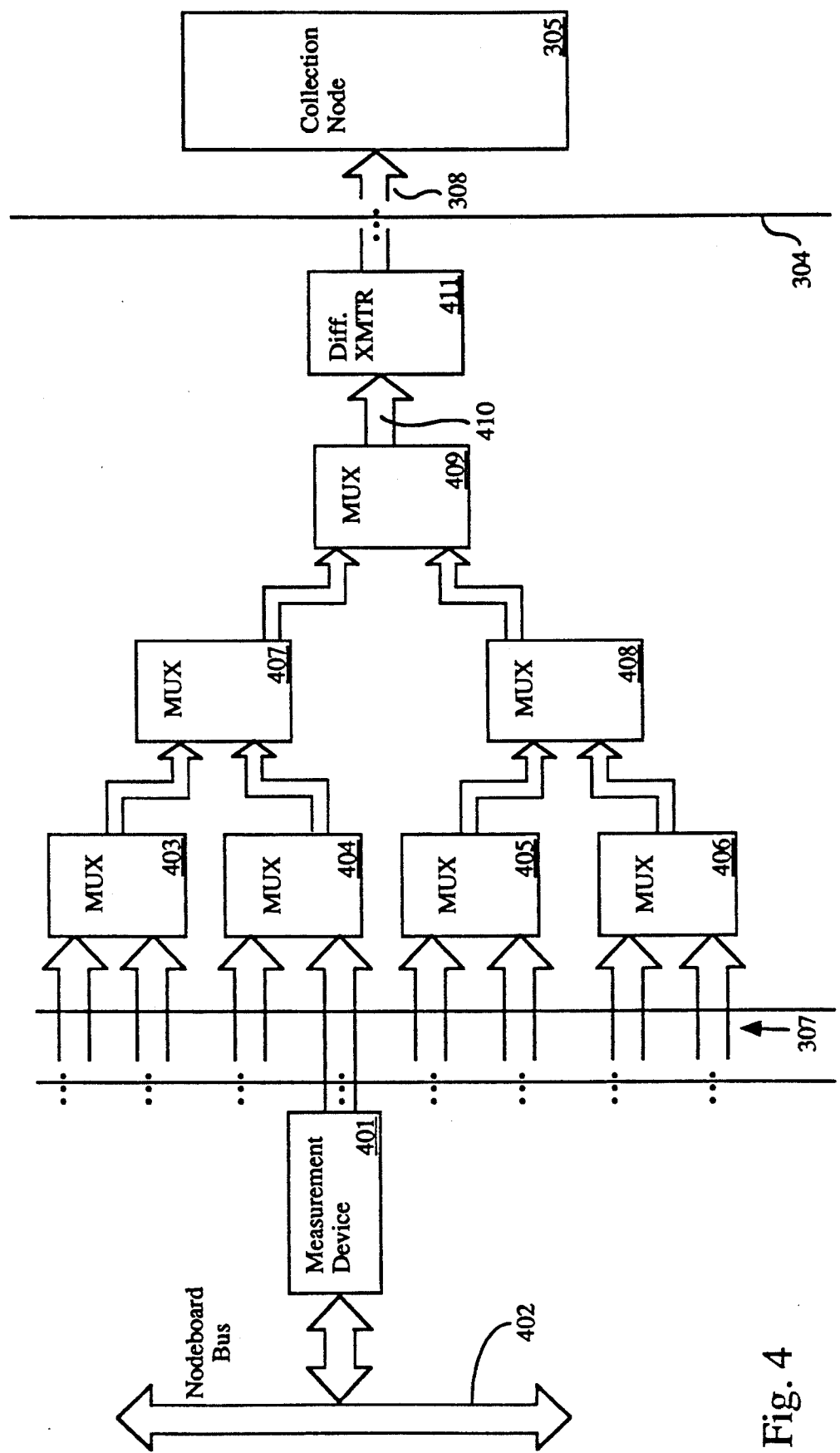
FIG. 4 illustrates the concentrator node of the present invention and the interaction of the concentrator node with a general purpose nodeboard and the collection node of the present invention.
Figure 5:
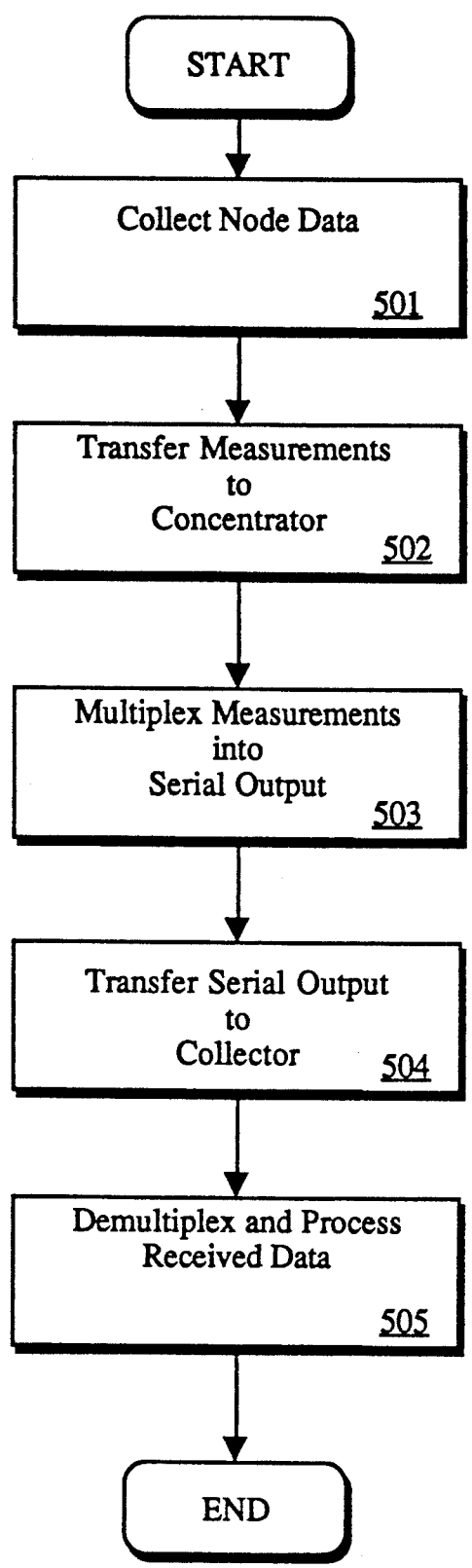
FIG. 5 is a flowchart diagramming the process of the present invention.

FIG. 4 illustrates the interaction between a node board and a concentrator node. Simultaneous reference is made to the flow chart of FIG. 5 diagramming the data collection process undertaken by the present invention. A measurement device 401 receives the data to be collected from the system bus 402 of one of the node boards, or by direct hardware means, e.g., directly from a counter on the node board. The measurement device 401 may be implemented using custom circuitry that includes timers and counters for designated events and a means for time stamping the data. The circuitry also provides rate buffering and synchronization to present the asynchronous stream of measured data to the concentrator node 304 in the appropriate synchronous format. The Multi Kron chip developed by the National Institute of Standards and Technology can be used to perform the primary measurement functions, but additional interface circuitry obvious to one skilled in the art is then necessary to provide rate buffering and synchronization.

Preferably, the measurement device 401 is used to provide node performance parameters, such as the number of times a particular subroutine or memory unit is accessed by the CPU, the percentage of bus bandwidth in use, or the communications traffic between different boards (step 501). The measurement device in each node board sends the measurement data across concentrator bus 307 to concentrator node 304 along with information identifying both the process being measured and the source node board (step 502). These "sends" are initiated by software on the node by doing a bus transaction on bus 402. Note that the concentrator bus 307 is independent of the message routing network used for internode communications. This non-invasive feature prevents interference with the data sent over the network during routine operations.

The concentrator node 304 may preferably be configured as a binary merging tree comprised of a number of asynchronous arbitrating multiplexers 403-409. The multiplexers can be implemented using custom routing circuitry, or with existing standard cell ASIC or programmable gate-array technology. Each multiplexer receives information in packets asynchronously from two buses in parallel, and arbitrates between the incoming message packets to output them in series over one bus. Each packet is identified as to its source, format and length, including a time stamp and a tail or end indication. The performance measurements arriving from different node boards over the concentrator bus 307 are presented to multiplexers 403-406, which may be considered the first level of the binary merging tree. As a final result, the last level of the tree comprises multiplexer 409, which outputs a serial sequence of performance data packets over one bus 410 (step 503). In one embodiment, the data on bus 410 is passed through a differential driver 411 before being sent over the collection bus 308 to the collection node 305 (step 504). Note that the merging tree may be expanded or contracted in size to accommodate the collection of data from as few or as many nodes as the hardware bus bandwidth can handle at bus 410.

Figure 6:
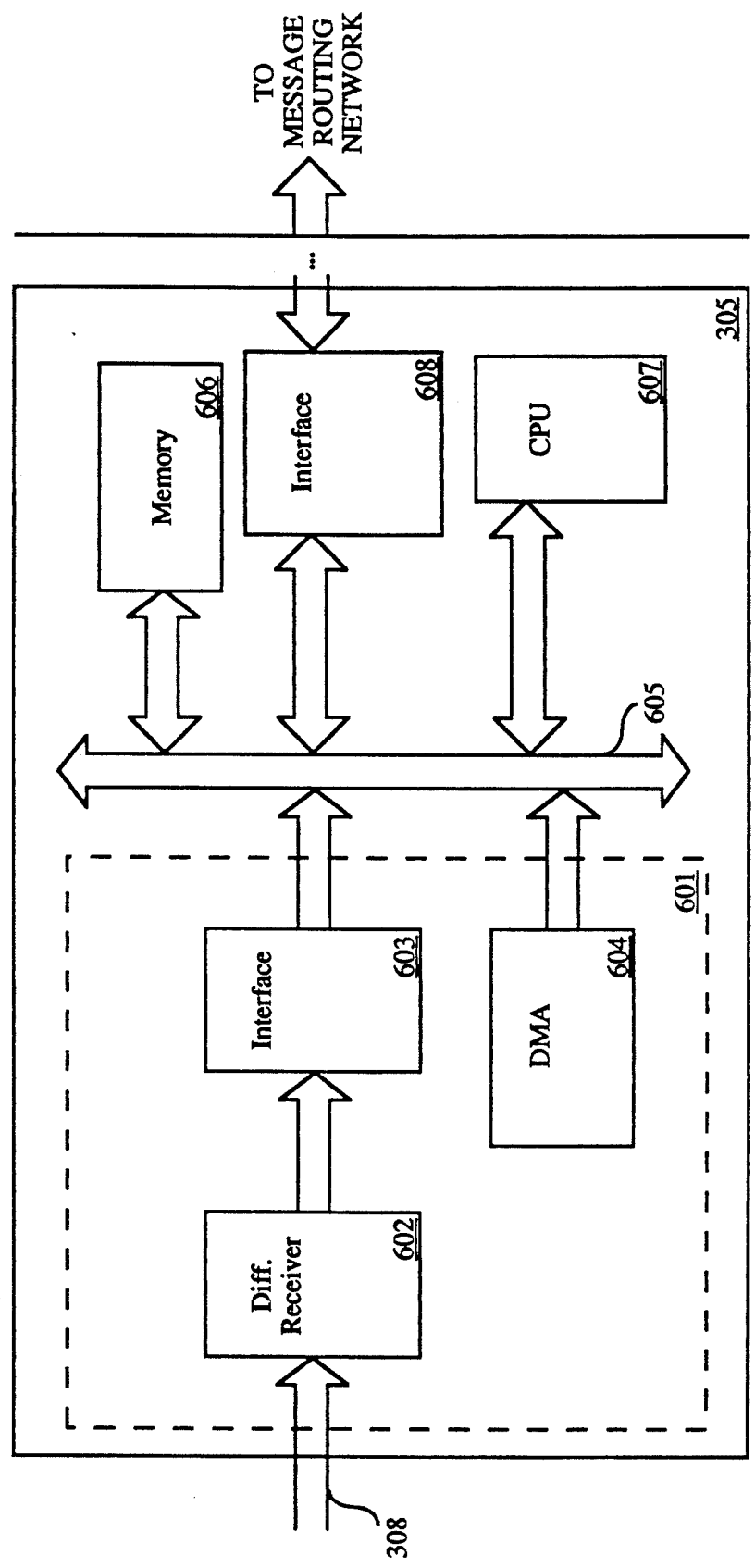
FIG. 6 is a block diagram of the collection node of the present invention.

FIG. 6 is a block diagram of collection node 305. Collection node 305 includes a general purpose node board attached to a collection daughterboard 601 that acts as an interface between the collection bus 308 and the general purpose node board portion of the collection node. The incoming data is first passed through a differential receiver 602 on the daughterboard before being presented to interface unit 603. The daughterboard includes a DMA controller 604 for gaining control of the node system bus 605 so that the collected data may be transferred to node memory 606 for demultiplexing and processing by the collection node CPU 607 (step 505).

The collection node 305 operates according to two basic paradigms. In the first, the system collects small amounts of data to be analyzed "on the fly", such data including, for example, the message traffic between two nodes over time. In that case, the collection node processor 607 might format the data for graphic display, and send it over interface 608 and the message routing network to another node that is set up to interface with graphic I/O.

In the alternative, the system can collect large quantities of data tracing designated events occurring step-by-step within application programs or the operating system. In this case, the collection processor 607 might direct that the data be stored on disk. After all the relevant trace data has been collected, then it can be appropriately processed by the collection node processor 607. Note that collection processor 607 groups the data appropriately according to header information transmitted with the data that represents the source of each data packet and other status information, such as time stamping.

Although the invention has been described in conjunction with preferred embodiments, it will be appreciated that various modifications and alterations might be made by those skilled in the art without departing from the spirit and scope of the invention.

What is claimed is:

1. A system for collecting data in a multi-processor including a message routing network for routing messages, the system comprising:
    a plurality of processing nodes, each node communicating with another node through the message routing network, each node having a measurement circuit for measuring predetermined events occurring within the node to produce a plurality of measurement data packets;
    a concentrator bus coupled to each node for receiving the measurement data packets from each node;
    a concentrator, coupled to the concentrator bus, for outputting a multiplexed serial sequence of the measurement data packets in response to a parallel asynchronous input of the measurement data packets received over the concentrator bus from said plurality of nodes;
    a collection bus coupled to said concentrator for receiving the serial sequence of measurement data packets; and
    a collection node coupled to said collection bus for receiving the serial sequence of measurement data packets and demultiplexing the measurement data packets.

2. The system of claim 1, wherein said measurement circuit includes time stamping logic circuitry for transmitting time stamp information as part of each measurement data packet.

3. The system of claim 1, wherein said measurement circuit includes identification logic circuitry for transmitting information identifying a source node as part of each measurement data packet.

4. The system of claim 1, wherein
    said concentrator bus includes a plurality of lines, each line connected to one of said measurement circuits, and
    said concentrator comprises a binary merging tree of asynchronous arbitrating multiplexers, said tree having an input for receiving said parallel, asynchronous measurement data packets from said lines, and an output for providing to said collection bus said serial sequence of measurement data packets.

5. In a multi-processor including a message routing network for routing messages and a plurality of processing nodes communicating with each other through the message routing network, a method for collecting data comprising the steps of:
    measuring predetermined events occurring within each node to produce a plurality of measurement data packets;
    receiving a parallel asynchronous input of the measurement data packets from the nodes;
    arbitrating between the received measurement data packets;
    multiplexing the arbitrated data packets on to a collection bus as a serial sequence of measurement data packets;
    receiving the serial sequence of measurement data packets; and
    demultiplexing the received serial sequence of measurement data packets.

6. The system of claim 5, further comprising the step of transmitting time stamp information as part of each measurement data packet.

7. The method of claim 5, further comprising the step of transmitting information identifying a source node as part of each measurement data packet.

* * * * *